United States Patent
Cao et al.

(10) Patent No.: US 9,693,245 B2
(45) Date of Patent: Jun. 27, 2017

(54) METHOD AND SYSTEM FOR MEASURING INTERFERENCE SIGNAL IN CARRIER SIGNAL

(71) Applicant: CHINA TELECOM CORPORATION LIMITED, Beijing (CN)

(72) Inventors: Lei Cao, Beijing (CN); Ye Zhao, Beijing (CN); Xiaodong Chen, Guangzhou (CN); Shangkun Xiong, Guangzhou (CN); Henghua Lin, Guangzhou (CN)

(73) Assignee: China Telecom Corporation Limited, Beijing (CN)

(*) Notice: Subject to any disclaimer, the term of this patent is extended or adjusted under 35 U.S.C. 154(b) by 161 days.

(21) Appl. No.: 14/366,188

(22) PCT Filed: Oct. 25, 2012

(86) PCT No.: PCT/CN2012/083468
§ 371 (c)(1),
(2) Date: Sep. 25, 2014

(87) PCT Pub. No.: WO2013/097528
PCT Pub. Date: Jul. 4, 2013

(65) Prior Publication Data
US 2015/0078183 A1     Mar. 19, 2015

(30) Foreign Application Priority Data
Dec. 28, 2011   (CN) .......................... 2011 1 0445956

(51) Int. Cl.
*H04W 24/08*     (2009.01)
*H04B 1/10*     (2006.01)
(Continued)

(52) U.S. Cl.
CPC .......... *H04W 24/08* (2013.01); *H04B 1/1027* (2013.01); *H04L 43/08* (2013.01);
(Continued)

(58) Field of Classification Search
CPC .... H04B 1/1027; H04W 24/08; H04W 24/02; H04L 43/08; H04L 12/26
See application file for complete search history.

(56) References Cited

U.S. PATENT DOCUMENTS

2005/0008097 A1*   1/2005   Tjhung .............. H03M 13/251
                                                              375/302
2005/0190825 A1*   9/2005   Sedarat .............. H04L 27/2608
                                                              375/222

FOREIGN PATENT DOCUMENTS

| CN | 101019390 A | 8/2007 |
|---|---|---|
| CN | 101217526 A | 7/2008 |
| CN | 101800721 A | 8/2010 |

OTHER PUBLICATIONS

International Search Report mailed Jan. 31, 2013 in PCT/CN2012/083468, 4 pages.

* cited by examiner

*Primary Examiner* — Anez Ebrahim
(74) *Attorney, Agent, or Firm* — Kilpatrick Townsend & Stockton LLP (57) ABSTRACT

Disclosed in the present disclosure are a method and system for measuring interference signals in carrier signals. The method comprises: receiving multiple valid samples of the carrier signals; based on the multiple valid samples of the carrier signals, gaining value of constant part and mean square error of zero mean part in the interference signals through iterative calculation; calculating the total power value of the interference signals. Since considering the constant part in the interference signals, the measurement
(Continued)

method is suitable in the case that the interference signals in the carrier signals is non-zero mean value, and the obtained measurement result of the interference signals will be more accurate than the result through the existing method.

10 Claims, 4 Drawing Sheets

(51) Int. Cl.
    *H04L 12/26*     (2006.01)
    *H04J 11/00*     (2006.01)
(52) U.S. Cl.
    CPC ............. *H04B 2201/709718* (2013.01); *H04J 11/0023* (2013.01)

METHOD AND SYSTEM FOR MEASURING INTERFERENCE SIGNAL IN CARRIER SIGNAL

CROSS-REFERENCE TO RELATED APPLICATIONS

This application is the U.S. National Phase of International Application No. PCT/CN2012/083468, International Filing Date Oct. 25, 2012, and which claims the benefit of CN patent application No. 201110445956.9, filed Dec. 28, 2011, the disclosures of both applications being incorporated herein by reference.

TECHNICAL FIELD

This disclosure relates to the technical field of mobile communication, and more particularly to a method and system for measuring interference signal in a carrier signal.

DESCRIPTION OF THE RELATED ART

In multicarrier systems, a data stream is generally split into multiple sub bit streams, each sub data stream having a low bit rate, and a corresponding subcarrier is modulated with low-rate multiple-state symbols so as to realize the parallel transmission of multiple symbol streams at a low rate. A representative modulation method in multicarrier systems is Orthogonal Frequency Division Multiplexing (OFDM), in which subcarriers are uniformly distributed over a frequency band and are orthogonal to each other. Being a candidate technique for 4G mobile communication systems in the physical layer, subcarriers may overlap with each other to improve spectrum utilization.

In actual systems, modulation and demodulation may be realized with Inverse Discrete Fourier Transform (IDFT) and Discrete Fourier Transform (DFT). At the transmitter, through a N-point IDFT processing, wherein N is the number of subcarriers, a signal to be transmitted is converted into a time-domain signal and then is transmitted to the receiver after upconversion modulation. At the receiver, coherent demodulation is performed on a received signal to obtain a baseband signal, on which a N-point DFT processing is applied. For various resource blocks or subcarriers, a multipath frequency-selective channel may be converted to N independent flat fading channels, wherein each subcarrier corresponds to a subcarrier.

In OFDMA systems, carrier gain and carrier interference are main factors for measuring the quality of various subcarrier channels. However, in existing carrier interference measurement methods, carrier interference is considered as a zero-mean stochastic process.

According to a research on existing carrier interference measurement methods of the applicant, it has been found that some measurement errors exist in those carrier interference measurement methods, because carrier interference is considered as a zero-mean stochastic process in existing carrier interference measurement methods. However, in practical applications, due to adjacent cell interference and other reasons, carrier interference signal may not necessarily satisfy the assumption of having a zero mean value. Thus, results obtained with existing carrier interference signal measurement methods are not accurate enough, and a study on a method for measuring non-zero mean value carrier interference signal is desirable.

SUMMARY

It has been found by the applicant that some measurement errors exist in existing carrier interference signal measurement methods. One object of this disclosure is to provide a new technical solution capable of, taking non-zero mean value carrier interference signal into account, accurately measuring the total power of interference signal within a carrier signal.

According to an aspect of this disclosure, a method for measuring interference signal in a carrier signal is provided, comprising:

receiving multiple valid samples of the carrier signal, the carrier signal including a transmitted signal and an interference signal, the interference signal having a constant component and a zero-mean component;

based on the multiple valid samples of the carrier signal, obtaining a quantity value of the constant component and a mean square error of the zero-mean component of the interference signal through an iterative calculation;

obtaining a total power value of the interference signal from the quantity value of the constant component and the mean square error of the zero-mean component of the interference signal.

Preferably, in the iterative calculation, an iteration initial value $I_0$ of the constant component of the interference signal is calculated as follows:

$$I_0 = \frac{1}{N}\sum_{n=1}^{N} x_n$$

Wherein, N is the number of the valid samples of the received carrier signal, Xn is a sample value received at a time n;

an iteration initial value $\sigma_0^2$ of the mean square error of the zero-mean component of the interference signal is calculated as follows:

$$\sigma_0^2 = \frac{1}{N}\sum_{n=1}^{N}(x_n - I_0)^2 + 1$$

Wherein, N is the number of the valid samples of the received carrier signal, Xn is a sample value received at a time n;

A quantity value $I_{K+1}$ of the constant component and a mean square error $\sigma_{k+1}^2$ of the zero-mean component of the interference signal are obtained through the iterative calculation using $I_0$ and $\sigma_0^2$, wherein $I_{k+1}$ is the K+1 iteration value of the constant component of the interference signal, $\sigma_{k+1}^2$ is the K+1 iteration value of the mean square error of the zero-mean component of the interference signal.

Preferably, the transmitted signal is BPSK-modulated signal, in the iterative calculation, $I_{k+1}$ and $\sigma_{k+1}^2$ are calculated as follows:

$$I_{k+1} = I_0 - \frac{1}{N}\sum_{n=1}^{N}\tanh\left(\frac{(x_n - I_k)}{\sigma_k^2}\right)$$

$$\sigma_{k+1}^2 = 1 + \frac{1}{N}\sum_{n=1}^{N}\left((x_n - I_k)^2 - \tanh\left(\frac{(x_n - I_k)}{\sigma_k^2}\right)2(x_n - I_k)\right)$$

Wherein, n and k are natural numbers, N is the number of the valid samples of the received carrier signal, Xn is a sample value received at a time n, k is a iteration number; $I_k$ is the K iteration value of the constant component of the interference signal, $\sigma_k^2$ is the K iteration value of the mean square error of the zero-mean component of the interference signal.

Preferably, the transmitted signal is a QAM-modulated signal, in the iterative calculation, $I_{k+1}$ and $\sigma_{k+1}^2$ are calculated as follows:

$$I_{k+1} = I_0 - \frac{1}{N}\sum_{n=1}^{N} \frac{\sum_{m=1}^{M}(2m-1)S_{m,n}(I_k, \sigma_k^2)}{\sum_{m=1}^{M} C_{m,n}(I_k, \sigma_k^2)}$$

$$\sigma_{k+1}^2 = \sigma_0^2 -$$

$$\frac{1}{N}\sum_{n=1}^{N}\left(\frac{\sum_{m=1}^{M}(4m(m-1)C_{m,n}(I_k, \sigma_k^2) - 2(2m-1)(x_n - I_k)S_{m,n}(I_k, \sigma_k^2))}{\sum_{m=1}^{M} C_{m,n}(I_k, \sigma_k^2)}\right)$$

Wherein, M represents a constellation order of the real and imaginary parts in QAM, $$C_{m,n}(I, \sigma^2) = \exp\left(-\frac{2m(m-1)}{\sigma^2}\right)\cosh\left(\frac{(2m-1)(x_n - I)}{\sigma^2}\right)$$

$$S_{m,n}(I, \sigma^2) = \exp\left(-\frac{2m(m-1)}{\sigma^2}\right)\sinh\left(\frac{(2m-1)(x_n - I)}{\sigma^2}\right)$$

Wherein, n, m, k are natural numbers, N is the number of the valid samples of the received carrier signal, Xn is a sample value received at a time n; $I_k$ is the K iteration value of the constant component of the interference signal, $\sigma_k^2$ is the K iteration value of the mean square error of the zero-mean component of the interference signal.

Preferably, it further comprises:
comparing $|I_{k+1} - I_k|$ against a first threshold, comparing $|\sigma_{k+1}^2 - \sigma_k^2|$ against a second threshold;
when $|I_{k+1} - I_k|$ is less than the first threshold and $|\sigma_{k+1}^2 - \sigma_k^2|$ is less than the second threshold, terminating the iterative calculation, wherein $I_{k+1}$ and $\sigma_{k+1}^2$ are the quantity value of the constant component and the mean square error of the zero-mean component of the interference signal obtained in the K+1 iteration, respectively.

Preferably, the total power value of the interference signal is the sum of $I_{k+1}^2$ and $\sigma_{k+1}^2$.

According to another aspect of this disclosure, a system for measuring interference signal in a carrier signal is further provided, comprising:

a carrier signal receiving unit for receiving multiple valid samples of the carrier signal, the carrier signal including a transmitted signal and an interference signal, the interference signal having a constant component and a zero-mean component;

an iterative calculation unit for, based on the multiple valid samples of the carrier signal, obtaining a quantity value of the constant component and a mean square error of the zero-mean component of the interference signal through an iterative calculation;

a total power calculation unit for obtaining a total power value of the interference signal from the quantity value of the constant component and the mean square error of the zero-mean component of the interference signal.

Preferably, in the iterative calculation unit, an iteration initial value $I_0$ of the constant component of the interference signal is calculated as follows:

$$I_0 = \frac{1}{N}\sum_{n=1}^{N} x_n$$

Wherein, N is the number of the valid samples of the received carrier signal, Xn is a sample value received at a time n;

an iteration initial value $\sigma_0^2$ of the mean square error of the zero-mean component of the interference signal is calculated in the iterative calculation unit as follows:

$$\sigma_0^2 = \frac{1}{N}\sum_{n=1}^{N}(x_n - I_0)^2 + 1$$

Wherein, N is the number of the valid samples of the received carrier signal, Xn is a sample value received at a time n;

The iterative calculation unit performs an iterative calculation using $I_0$ and $\sigma_0^2$ to obtain a quantity value $I_{K+1}$ of the constant component and a mean square error $\sigma_{k+1}^2$ of the zero-mean component of the interference signal, wherein $I_{k+1}$ is the K+1 iteration value of the constant component of the interference signal, $\sigma_{k+1}^2$ is the K+1 iteration value of the mean square error of the zero-mean component of the interference signal.

Preferably, for a transmitted signal which is a BPSK-modulated signal, the iterative calculation unit calculates $I_{k+1}$ and $\sigma_{k+1}^2$ as follows:

$$I_{k+1} = I_0 - \frac{1}{N}\sum_{n=1}^{N}\tanh\left(\frac{(x_n - I_k)}{\sigma_k^2}\right)$$

$$\sigma_{k+1}^2 = 1 + \frac{1}{N}\sum_{n=1}^{N}\left((x_n - I_k)^2 - \tanh\left(\frac{(x_n - I_k)}{\sigma_k^2}\right)2(x_n - I_k)\right)$$

Wherein, n and k are natural numbers, N is the number of the valid samples of the received carrier signal, Xn is a sample value received at a time n; $I_k$ is the K iteration value of the constant component of the interference signal, $\sigma_k^2$ is the K iteration value of the mean square error of the zero-mean component of the interference signal.

For a transmitted signal which is a QAM-modulated signal, the iterative calculation unit calculates $I_{k+1}$ and $\sigma_{k+1}^2$ as follows:

$$I_{k+1} = I_0 - \frac{1}{N}\sum_{n=1}^{N}\frac{\sum_{m=1}^{M}(2m-1)S_{m,n}(I_k, \sigma_k^2)}{\sum_{m=1}^{M} C_{m,n}(I_k, \sigma_k^2)}$$

$$\sigma_{k+1}^2 = \sigma_0^2 -$$

$$\frac{1}{N}\sum_{n=1}^{N}\left(\frac{\sum_{m=1}^{M}(4m(m-1)C_{m,n}(I_k, \sigma_k^2) - 2(2m-1)(x_n - I_k)S_{m,n}(I_k, \sigma_k^2))}{\sum_{m=1}^{M} C_{m,n}(I_k, \sigma_k^2)}\right)$$

Wherein, M represents a constellation order of the real and imaginary parts in QAM, $$C_{m,n}(I, \sigma^2) = \exp\left(-\frac{2m(m-1)}{\sigma^2}\right) \cosh\left(\frac{(2m-1)(x_n-I)}{\sigma^2}\right)$$

$$S_{m,n}(I, \sigma^2) = \exp\left(-\frac{2m(m-1)}{\sigma^2}\right) \sinh\left(\frac{(2m-1)(x_n-I)}{\sigma^2}\right)$$

Wherein, n, m, k are natural numbers, N is the number of the valid samples of the received carrier signal, Xn is a sample value received at a time n; $I_k$ is the K iteration value of the constant component of the interference signal, $\sigma_k^2$ is the K iteration value of the mean square error of the zero-mean component of the interference signal.

Preferably, the iterative calculation unit is further used to: compare $|I_{k+1}-I_k|$ against a first threshold and compare $|\sigma_{k+1}^2-\sigma_k^2|$ against a second threshold; when $|I_{k+1}-I_k|$ is less than the first threshold and $|\sigma_{k+1}^2-\sigma_k^2|$ is less than the second threshold, terminate the iterative calculation, wherein $I_{k+1}$ and $\sigma_{k+1}^2$ are the quantity value of the constant component and the mean square error of the zero-mean component of the interference signal obtained in the K+1 iteration, respectively.

The total power calculation unit calculate the sum of $I_{k+1}^2$ and $\sigma_{k+1}^2$ as the total power value of the interference signal.

One advantage of this disclosure is that the calculated total power value of the interference signal is the sum of the quantity value of the constant component and the mean square error of the zero-mean component of the interference signal. This measurement method is directed to carrier interference signal with a non-zero mean value, in which the constant component of the interference signal is taken into account. Thus, a more accurate measurement result of interference signal in a carrier signal may be obtained. Further, because a situation is considered in which the interference signal has a non-zero mean value, the method is applicable to carrier signals with different interference signals. Therefore, the technical solution provided in this disclosure enables a broader range of applications.

From the detail description of exemplary embodiments of this disclosure given below with reference to the accompanying drawings, other features and advantages of this disclosure will become more apparent.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

With reference to the drawings, this disclosure may be understood more clearly according to the following description, wherein.

DETAILED DESCRIPTION OF THE PREFERRED EMBODIMENT

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

Meanwhile, it should be appreciated that, for the convenience of description, various parts shown in those drawings are not necessarily drawn on scale.

The following description of at least one exemplary embodiment is merely illustrative in nature and is in no way intended to limit the disclosure, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

Figure 1:
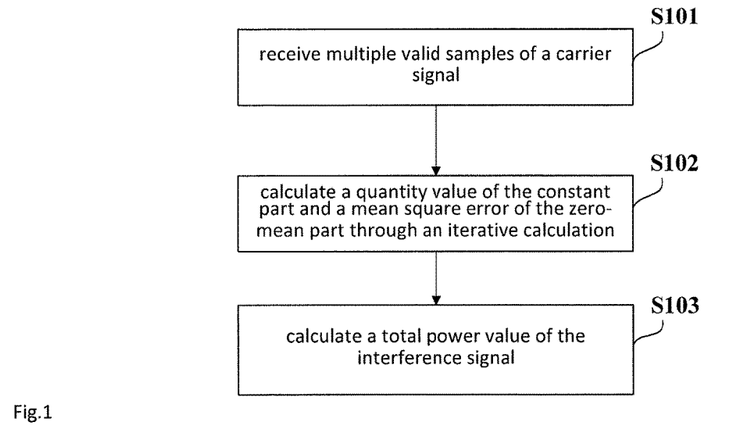
FIG. 1 shows a flowchart of an embodiment of a method that is provided in this disclosure.

FIG. 1 shows a flowchart of an embodiment of a method that is provided in this disclosure.

At step S101, multiple valid samples of a carrier signal are received.

A process may be performed for each carrier wave separately. A carrier signal may be expressed with the following signal model:

$$x(n)=s(n)+u(n)=s(n)+I+v(n)$$

Wherein, n is a time index, x(n) represent a received carrier signal, s(n) represents a transmitted signal, u(n) represents an interference signal with a non-zero mean value, wherein the interference signal is an interference signal contained in the carrier signal in addition to an effective signal. The received carrier signal may comprise a transmitted signal s(n) and an interference signal u(n). Wherein the interference signal u(n) may comprise a constant component I and a zero-mean component v(n). I is a constant representing the mean of non-zero mean interference, which is also referred to as deterministic interference.

For each carrier wave, channel gain, i.e., the transmitted signal s(n), may be obtained with any channel estimation algorithm that is well known by those skilled in the art.

Multiple effective samples of a carrier signal are received to measure interference contained in the carrier signal. In an embodiment provided in this disclosure, receiving multiple effective samples of a carrier signal is only based on a set of effective symbols that are received without being aware of the content of the transmitted signal s(n). The number of effective samples may be determined based on actual needs, and does not have any limitation thereof.

Further, in practical applications, according to requirements of practical applications, the effectiveness of samples and conditions under which the samples are obtained may be further considered. Effective samples are sample point signals of the carrier signal that are correctly received and identified. For example, it is necessary to keep statistical interference/noise characteristics unchanged in an interference/noise estimation process, that is, the interference must have constant mean and variance. Thereby, it is required that the samples are obtained from the same carrier wave and the same user, spanning over a time window that is not too large, so as to guarantee unchanged channel interference/noise characteristics of the samples. Also, there is a requirement about the transmitted data, for example, the transmitted data must show a random characteristic.

At step S102, based on the multiple effective samples of the received carrier signal, a quantity value of the constant component and a mean square error of the zero-mean component of the interference signal are obtained through an iterative calculation.

In an embodiment of this disclosure, a quantity value I of the constant component of the interference signal and a variance of the zero-mean component v(n) of the interference signal are estimated respectively, wherein the variance of v(n) is $\sigma^2$, after that a total power value of the interference signal is further calculated.

Different estimation methods may be used for transmitted signals in different modulation manners. Below, an illustration will be given in which Binary Phase Shift Keying (BPSK) and Quadrature Amplitude Modulation (QAM) are taken as examples. Those skilled in the art benefiting from the concept of this disclosure may come up with estimation methods for transmitted signals modulated in other manners to further calculate the total power of the interference signal.

For a transmitted signal that is BPSK modulated, the zero-mean component of the interference signal v(n) is a Gaussian noise. When the transmitted signal is a BPSK signal with a constellation $\{-1,+1\}$, the probability density function of the received signal may be represented as:

$$f(x) = \frac{1}{2} \frac{1}{\sqrt{2\pi\sigma^2}} \left[ \exp\left(-\frac{(x-1-I)^2}{2\sigma^2}\right) + \exp\left(-\frac{(x+1-I)^2}{2\sigma^2}\right) \right]$$

A receiver receives N samples $x(1), x(2), \ldots x(N)$ of the received signal, and then obtain a log-likelihood function $L(x) = \ln\{f(x_1)f(x_2) \ldots f(x_N)\}$ represented as follows:

$$L(x) = \frac{N}{2} \ln\left(\frac{1}{2\pi\sigma^2}\right) + \sum_{n=1}^{N} \left( -\frac{(x_n - I)^2 + 1}{2\sigma^2} + \ln\cosh\left(\frac{2(x_n - I)}{2\sigma^2}\right) \right)$$

According to the Maximum likelihood method (ML), the above log-likelihood function is maximized to obtain corresponding I and $\sigma^2$ as an estimation result. Based on the ML criterion, a more accurate estimation may be obtained.

Taking partial derivatives of L(x) with respect to I and $\sigma^2$ respectively and setting the partial derivatives to zero, the following linear equations containing I and $\sigma^2$ may be obtained:

$$I = \frac{1}{N} \sum_{n=1}^{N} x_n - \frac{1}{N} \sum_{n=1}^{N} \tanh\left(\frac{(x_n - I)}{\sigma^2}\right)$$

$$\sigma^2 = 1 + \frac{1}{N} \sum_{n=1}^{N} \left( (x_n - I)^2 - \tanh\left(\frac{(x_n - I)}{\sigma^2}\right) 2(x_n - I) \right)$$

In order to obtain a closed-form estimation of I and $\sigma^2$, an iterative calculation is performed to solve the equations. The iterative calculation mainly comprises two steps: initialization and iterative updating.

At the initialization step, to simplify the calculation, the last items on the right side of the above two equations are ignored, to obtain an iteration initial value $I_0$ of the constant component of the interference signal and an iteration initial value $\sigma_0^2$ of the mean square error of the zero-mean component of the interference signal. The calculation equations are as follows:

$$I_0 = \frac{1}{N} \sum_{n=1}^{N} x_n$$

$$\sigma_0^2 = \frac{1}{N} \sum_{n=1}^{N} (x_n - I_0)^2 + 1$$

Wherein, N is the number of the valid samples of the received carrier signal, Xn is a sample value received at a time n.

Then, a quantity value $I_{k+1}$ of the constant component and a mean square error $\sigma_{k+1}^2$ of the zero-mean component of the interference signal are obtained through the iterative calculation using $I_0$ and $\sigma_0^2$, wherein $I_{k+1}$ is the K+1 iteration value of the constant component of the interference signal, $\sigma_{k+1}^2$ is the K+1 iteration value of the mean square error of the zero-mean component of the interference signal.

Particularly, an iteration update result is calculated using two equations as follows:

$$I_{k+1} = I_0 - \frac{1}{N} \sum_{n=1}^{N} \tanh\left(\frac{(x_n - I_k)}{\sigma_k^2}\right)$$

$$\sigma_{k+1}^2 = 1 + \frac{1}{N} \sum_{n=1}^{N} \left( (x_n - I_k)^2 - \tanh\left(\frac{(x_n - I_k)}{\sigma_k^2}\right) 2(x_n - I_k) \right)$$

Wherein, n and k are natural numbers, N is the number of the valid samples of the received carrier signal, n is the serial number of sample point, Xn is a sample value received at a time n, k is a iteration number; $I_k$ is the K iteration value of the constant component of the interference signal, $\sigma_k^2$ is the K iteration value of the mean square error of the zero-mean component of the interference signal.

For a transmitted signal that is QAM modulated, the real part and the imaginary part of the received signal may be processed separately. Both parts may be processed in the same manner. The real part and the imaginary part of the QAM signal have the same constellation $\{-2M+1, \ldots -1, +1 \ldots 2M-1\}$, wherein M represents the order of the constellation of the QAM real part and the imaginary part. Both the probability density functions of real part and the imaginary part of the received signal may be represented as:

$$f(x) = \frac{1}{2M}$$

$$\frac{1}{\sqrt{2\pi\sigma^2}} \left[ \sum_{m=1}^{M} \exp\left(-\frac{(x-(2m-1)-I)^2}{2\sigma^2}\right) + \exp\left(-\frac{(x+(2m-1)-I)^2}{2\sigma^2}\right) \right]$$

The obtained log-likelihood function is represented as follows:

$$L(x) = -N\ln M + \frac{N}{2} \ln\left(\frac{1}{2\pi\sigma^2}\right) + \sum_{n=1}^{N} \left( -\frac{(x_n - I)^2 + 1}{2\sigma^2} + \sum_{m=1}^{M} C_{m,n}(I, \sigma^2) \right)$$

Wherein $$C_{m,n}(I, \sigma^2) = \exp\left(-\frac{2m(m-1)}{\sigma^2}\right)\cosh\left(\frac{(2m-1)(x_n-I)}{\sigma^2}\right)$$

is an estimation result. n, m are natural numbers.

Similarly, taking partial derivatives of L(x) with respect to I and $\sigma^2$ respectively and setting the partial derivatives to zero, the following linear equations containing I and $\sigma^2$ may be obtained:

$$I = \frac{1}{N}\sum_{n=1}^{N} x_n - \frac{1}{N}\sum_{n=1}^{N}\frac{\sum_{m=1}^{M}(2m-1)S_{m,n}(I,\sigma^2)}{\sum_{m=1}^{M} C_{m,n}(I,\sigma^2)}$$

$$\sigma^2 = 1 + \frac{1}{N}\sum_{n=1}^{N}\left((x_n - I)^2 - \frac{\sum_{m=1}^{M}(4m(m-1)C_{m,n}(I,\sigma^2) - 2(2m-1)(x_n - I)S_{m,n}(I,\sigma^2))}{\sum_{m=1}^{M} C_{m,n}(I,\sigma^2)}\right)$$

wherein, $$S_{m,n}(I, \sigma^2) = \exp\left(-\frac{2m(m-1)}{\sigma^2}\right)\sinh\left(\frac{(2m-1)(x_n-I)}{\sigma^2}\right)$$

Similarly, with an iteration calculation, the iterative calculation mainly comprises two steps: initialization and iterative updating. At the initialization step, to simplify the calculation, the last items on the right side of the above two equations are ignored, to obtain an iteration initial value $I_0$ of the constant component of the interference signal and an iteration initial value $\sigma_0^2$ of the mean square error of the zero-mean component of the interference signal similar to BPSK modulation. The calculation equations are as follows:

$$I_0 = \frac{1}{N}\sum_{n=1}^{N} x_n$$

$$\sigma_0^2 = \frac{1}{N}\sum_{n=1}^{N}(x_n - I_0)^2 + 1$$

An iterative calculation is performed using $I_0$ and $\sigma_0^2$, in which $I_0$ and $\sigma_0^2$ are calculated according to the following equations respectively:

$$I_{k+1} = I_0 - \frac{1}{N}\sum_{n=1}^{N}\frac{\sum_{m=1}^{M}(2m-1)S_{m,n}(I_k,\sigma_k^2)}{\sum_{m=1}^{M} C_{m,n}(I_k,\sigma_k^2)}$$

$$\sigma_{k+1}^2 = \sigma_0^2 - \frac{1}{N}\sum_{n=1}^{N}\left(\frac{\sum_{m=1}^{M}(4m(m-1)C_{m,n}(I_k,\sigma_k^2) - 2(2m-1)(x_n - I_k)S_{m,n}(I_k,\sigma_k^2))}{\sum_{m=1}^{M} C_{m,n}(I_k,\sigma_k^2)}\right)$$

Wherein, M is the constellation order of the QAM real part and the imagery part, n, m, k are natural numbers, and m is an intermediate variable.

$$C_{m,n}(I, \sigma^2) = \exp\left(-\frac{2m(m-1)}{\sigma^2}\right)\cosh\left(\frac{(2m-1)(x_n-I)}{\sigma^2}\right)$$

$$S_{m,n}(I, \sigma^2) = \exp\left(-\frac{2m(m-1)}{\sigma^2}\right)\sinh\left(\frac{(2m-1)(x_n-I)}{\sigma^2}\right)$$

N is the number of the valid samples of the received carrier signal, Xn is a sample value received at a time n. $I_k$ is the K iteration value of the constant component of the interference signal, $\sigma_k^2$ is the K iteration value of the mean square error of the zero-mean component of the interference signal.

Notice that the transmitted signal may be modulated in different manners. The modulation methods include but not limited to BPSK and QAM. Thus, for a transmitted signal that is modulated in a different manner, expressions that are used in the iterative calculation of the K iteration value $I_k$ of the constant component and the K iteration value $\sigma_k^2$ of the mean square error of the zero-mean component may be different.

For the completion of the iterative calculation, an iteration number may be specified. When the iteration number is reached, the iterative calculation terminates. Or a determination may be made based on an iteration result. The iterative calculation terminates if the iteration result satisfies a certain condition. As to the embodiment in which an iteration number is specified, it may be implemented according to methods that are well known by those skilled in the art. Taking the last method, i.e., making a determination based on an iteration result, as an example, a detail description will be given in this embodiment.

In the iteration calculation, a first determination and a second determination may be made on an iteration result. Particularly, a first threshold and a second threshold may be specified to compare $|I_{k+1} - I_k|$ against the first threshold and compare $|\sigma_{k+1}^2 - \sigma_k^2|$ against the second threshold. When $|I_{k+1} - I_k|$ is less than the first threshold and $|\pi_{k+1}^2 - \sigma_k^2|$ is less than the second threshold, it may be considered that a condition of convergence has been met and the iterative calculation may terminate. $I_{k+1}$ and $\sigma_{k+1}^2$ are the quantity value of the constant component and the mean square error of the zero-mean component of the interference signal obtained through the iteration calculation respectively.

The thresholds may be reasonably set in the iteration calculation according to computing conditions and error requirements. For example, the thresholds may have values ranging from $10^{-3}$ to $10^{-5}$. For example, in this embodiment, the threshold used herein is $10^{-3}$.

Figure 2A:
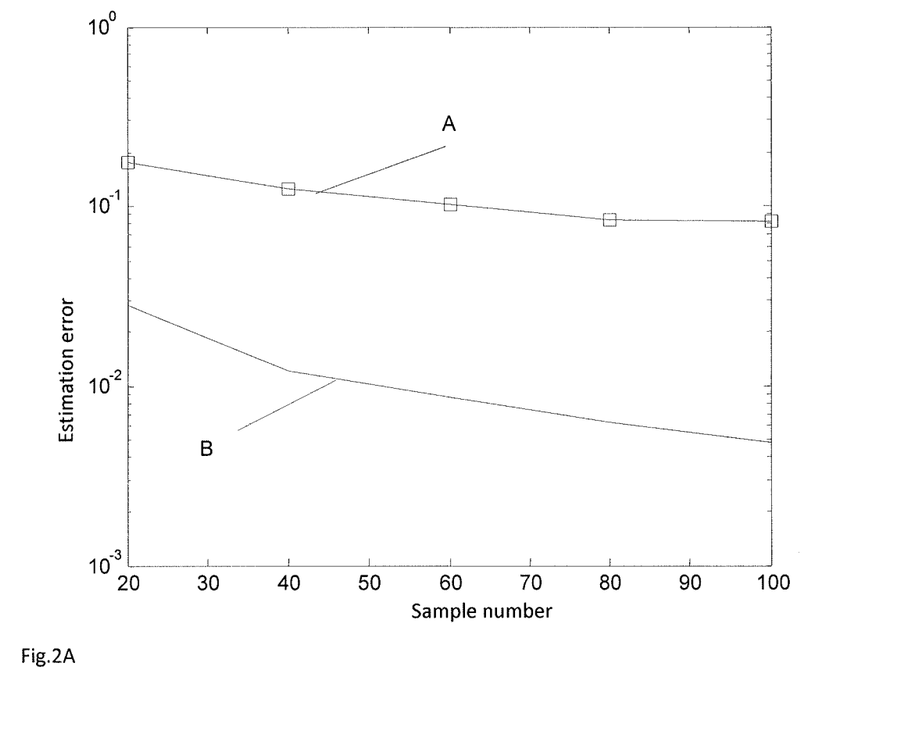
FIG. 2A shows estimation errors of the method provided in this disclosure and a contrast method.
Figure 2B:
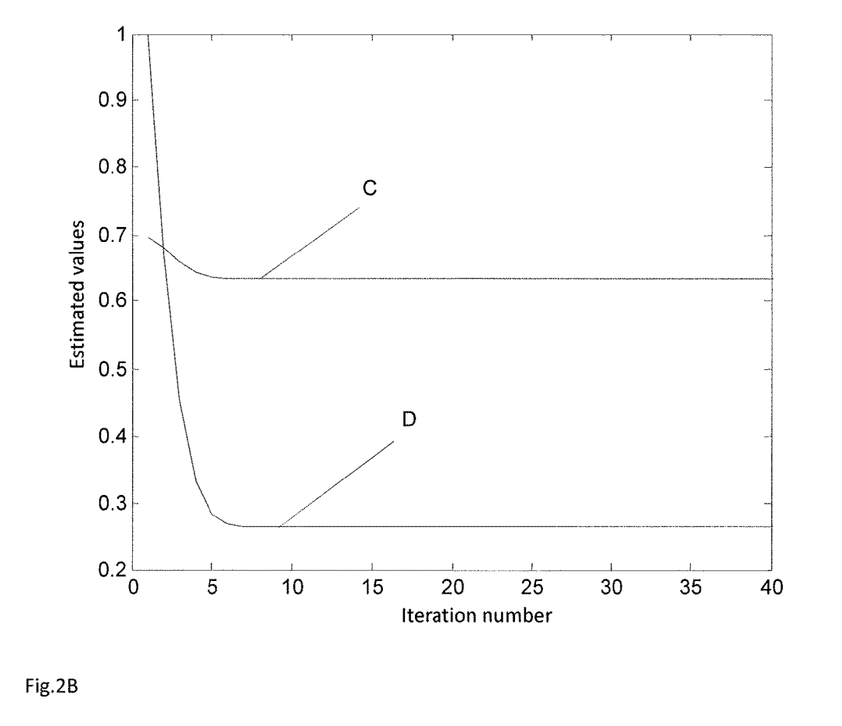
FIG. 2B shows an iteration convergence test of the method provided in this disclosure.

In order to clearly describe the technical solution of this disclosure and its effect, a detail description of the method of this disclosure for measuring interference signal in a carrier signal and its effect will be given below with reference to FIG. 2A to FIG. 2B. FIG. 2A shows estimation errors of a method provided in this disclosure and a contrast method, FIG. 2B shows an iteration convergence test of the method provided in this disclosure.

In this example, a measurement result of computer simulation is given. Simulation parameters are as follows: transmitted symbols are binary random signals, deterministic interference I=0.5, noise variance=0.2512, corresponding SNR=6 dB, simulation number=200. Signals that are transmitted each time and noises are randomly generated, and then an average error of parameter estimations is obtained.

Estimation error shown by the vertical axis of FIG. 2A is measured as mean square error, i.e., estimation error= E{(estimation result−actual parameter)²}. Wherein, E{ } represents the average of multiple repetitive tests.

In the contrast method shown in FIG. 2A, only random noise error is considered. Calculation is performed in an application based on statistics. Particularly, the constant component of the interference signal is not considered, instead of an iterative calculation, the initial value of the mean square error of the zero-mean component is taken as its estimation result.

In FIG. 2A, line A represents estimation errors obtained with an existing method, line B represents estimation errors of the estimation method provided in this disclosure. It can be seen from FIG. 2A, estimation errors obtained with the contrast method is far larger than the estimation errors of measurements performed according to this disclosure.

In FIG. 2B, line C represents estimated quantities of the constant component of the interference signal, and line D represents estimated mean square errors of the zero-mean component of the interference signal. It can be seen from FIG. 2B, the iterative calculation adopted in this disclosure converges upon 10 iterations.

At step S103, a total power value of the interference signal is obtained from the quantity of the constant component of the interference signal and the mean-square error of the zero-mean component of the interference signal.

Particularly, the total power value of the interference signal may be the sum of $I_{k+1}^2$ and $\sigma_{k+1}^2$.

With the carrier interference measurement method of this disclosure, the calculated total power value of the interference signal is the sum of the quantity of the constant component of the interference signal and the mean-square error of the zero-mean component of the interference signal. This measurement method is directed to a situation in which interference signal in the carrier signal has a non-zero mean value to take the constant component of the interference signal into account. Thus, a more accurate interference signal measurement result may be obtained.

Figure 3:
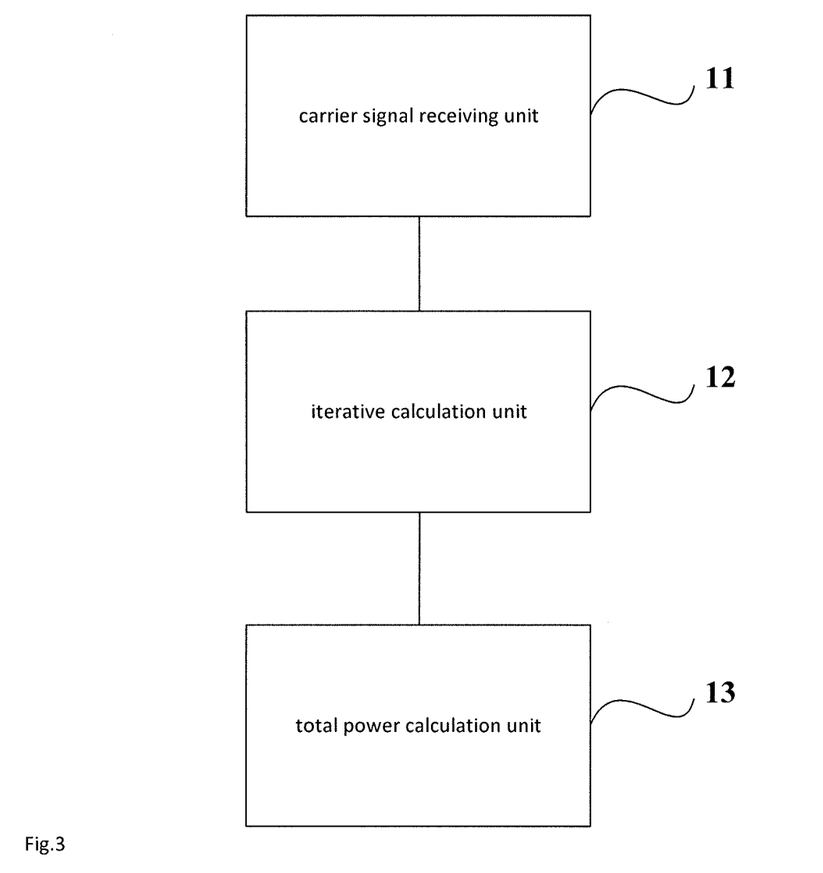
FIG. 3 shows a structural diagram of an embodiment of a system provided in this disclosure.

A system for measuring interference signal contained in a carrier signal is further disclosed in this disclosure. FIG. 3 shows a structural diagram of an embodiment of a system provided in this disclosure.

The system may comprise a carrier signal receiving unit 11, an iterative calculation unit 12 and a total power calculation unit 13.

The carrier signal receiving unit 11 receives multiple valid samples of the carrier signal. The carrier signal may comprise a transmitted signal and an interference signal.

The interference signal may comprise a constant component and a zero-mean component.

The iterative calculation unit 12 may obtain a quantity value of the constant component and a mean square error of the zero-mean component of the interference signal through an iterative calculation based on the multiple valid samples received by the carrier signal receiving unit 11.

The iterative calculation unit 12 may calculate an iteration initial value $I_0$ of the constant component of the interference signal according to the following equation:

$$I_0 = \frac{1}{N}\sum_{n=1}^{N} x_n$$

Wherein, N is the number of the valid samples of the received carrier signal, Xn is a sample value received at a time n.

The iterative calculation unit 12 may calculate an initial iteration value $\sigma_0^2$ of the mean square error of the zero-mean component of the interference signal according to the following equation:

$$\sigma_0^2 = \frac{1}{N}\sum_{n=1}^{N}(x_n - I_0)^2 + 1$$

Wherein, N is the number of the valid samples of the received carrier signal, Xn is a sample value received at a time n.

The iterative calculation unit 12 may perform an iterative calculation using $I_0$ and $\sigma_0^2$ to obtain a quantity value $I_{K+1}$ of the constant component and a mean square error $\sigma_{k+1}^2$ of the zero-mean component of the interference signal, wherein $I_{k+1}$ is the K+1 iteration value of the constant component of the interference signal, $\sigma_{k+1}^2$ is the K+1 iteration value of the mean square error of the zero-mean component of the interference signal.

For transmitted signals that are modulated in different manners, the K iteration values of the constant components and the K+1 iteration values $\sigma_k^2$ of the mean square errors of the zero-mean components of the interference signals may be different.

Preferably, for a transmitted signal which is a BPSK-modulated signal, in the iterative calculation:

$$I_{k+1} = I_0 - \frac{1}{N}\sum_{n=1}^{N}\tanh\left(\frac{(x_n - I_k)}{\sigma_k^2}\right)$$

$$\sigma_{k+1}^2 = 1 + \frac{1}{N}\sum_{n=1}^{N}\left((x_n - I_k)^2 - \tanh\left(\frac{(x_n - I_k)}{\sigma_k^2}\right)2(x_n - I_k)\right)$$

Wherein, n and k are natural numbers, N is the number of the valid samples of the received carrier signal, Xn is a sample value received at a time n; $I_k$ is the K iteration value of the constant component of the interference signal, $\sigma_k^2$ is the K iteration value of the mean square error of the zero-mean component of the interference signal.

For a transmitted signal which is a QAM-modulated signal, in the iterative calculation:

$$I_{k+1} = I_0 - \frac{1}{N}\sum_{n=1}^{N}\frac{\sum_{m=1}^{M}(2m-1)S_{m,n}(I_k, \sigma_k^2)}{\sum_{m=1}^{M}C_{m,n}(I_k, \sigma_k^2)}$$

$$\sigma_{k+1}^2 = \sigma_0^2 - \frac{1}{N}\sum_{n=1}^{N}\left(\frac{\sum_{m=1}^{M}(4m(m-1)C_{m,n}(I_k, \sigma_k^2) - 2(2m-1)(x_n - I_k)S_{m,n}(I_k, \sigma_k^2))}{\sum_{m=1}^{M}C_{m,n}(I_k, \sigma_k^2)}\right)$$

Wherein, M represents a constellation order of the real and imaginary parts in QAM, $$C_{m,n}(I, \sigma^2) = \exp\left(-\frac{2m(m-1)}{\sigma^2}\right)\cosh\left(\frac{(2m-1)(x_n-I)}{\sigma^2}\right)$$

$$S_{m,n}(I, \sigma^2) = \exp\left(-\frac{2m(m-1)}{\sigma^2}\right)\sinh\left(\frac{(2m-1)(x_n-I)}{\sigma^2}\right)$$

Wherein, n, m, k are natural numbers, N is the number of the valid samples of the received carrier signal, Xn is a sample value received at a time n; $I_k$ is the K iteration value of the constant component of the interference signal, $\sigma_k^2$ is the K iteration value of the mean square error of the zero-mean component of the interference signal.

Notice that the modulation methods of the transmitted signal are not limited to the above two manners. Correspondingly, in the iteration calculation, the expression of the quantity value of the constant component and the expression of the mean-square error of the zero-mean component may be adjusted accordingly.

To terminate the iterative calculation, an iteration number may be specified so that the iterative calculation terminates when the iteration number is reached, or a determination may be made on the result of the iterative calculation and the iterative calculation terminates if the result satisfies a certain condition.

For instant, in this embodiment, the iterative calculation unit 12 may compare $|I_{k+1}-I_k|$ against a first threshold and compare $|\pi_{k+1}^2-\sigma_k^2|$ against a second threshold. When $|I_{k+1}-I_k|$ is less than the first threshold and $|\sigma_{k+1}^2-\sigma_k^2|$ is less than the second threshold, the iterative calculation terminates, wherein $I_{k+1}$ and $\sigma_{k+1}^2$ are the quantity value of the constant component and the mean square error of the zero-mean component of the interference signal obtained in the K+1 iteration, respectively.

The total power calculation unit 13 may obtain a total power value of the interference signal from the quantity value of the constant component and the mean square error of the zero-mean component of the interference signal.

Particularly, the total power calculation unit 13 may calculate the sum of $I_{K+1}^2$ and $\sigma_{k+1}^2$ as the total power value of the interference signal.

Various embodiments of this disclosure have been described in a progressive manner, wherein each embodiment has emphases different to other embodiments. A mutual reference can be made to various embodiments for the same or similar portions thereof. With respect to the system embodiment, due to the correspondence to the method embodiments thereof, only a simple description is given, refer to those method embodiments for related portions.

The method and system of this disclosure may be realized in many manners. For example, the method and system of this disclosure may be realized by software, hardware, firmware or any combination thereof. The above sequence of steps in the method is merely for illustration, and thus unless specified otherwise, the steps in the method of this disclosure are not limited to the sequence particularly described above. Further, in some embodiments, this disclosure can be implemented as programs recorded in a record medium, including machine readable instructions for implementing the method of this disclosure. Therefore, those record mediums storing programs for implementing the method of this disclosure are also covered in this disclosure.

Although some particular embodiments of this disclosure have been described in detail with examples, those skilled in the art may understand that the above examples are merely for illustration but not limitation on the scope of this disclosure. Those skilled in the art may understand various modifications can be made to the above embodiments without departing from the scope of this disclosure. The scope of this disclosure is defined by attached claims.

What is claimed is:

1. A method for measuring an interference signal in a carrier signal, wherein:

receiving, by a receiver, multiple valid samples of the carrier signal, the carrier signal including a transmitted signal and an interference signal, the interference signal having a constant component and a zero-mean component;

based on the multiple valid samples of the carrier signal, obtaining, by the receiver, a quantity value of the constant component and a mean square error of the zero-mean component of the interference signal through an iterative calculation;

obtaining, by the receiver, a total power value of the interference signal from the quantity value of the constant component and the mean square error of the zero-mean component of the interference signal, so that the quality of carrier channel can be assessed; and performing an iterative calculation using $I_0$ and $\sigma_0^2$ to obtain a quantity value $I_{K+1}$ of the constant component and a mean square error $\sigma_{k+1}^2$ of the zero-mean component of the interference signal, wherein $I_{k+1}$ is the (K+1)th iteration value of the constant component of the interference signal, $\sigma_{k+1}^2$ is the (K+1)th iteration value of the mean square error of the zero-mean component of the interference signal; and, wherein in the iterative calculation:

$I_0$ is an iteration initial value of the constant component of the interference signal and is calculated according to the following equation:

$$I_0 = \frac{1}{N}\sum_{n=1}^{N} x_n,$$

wherein N is the number of the valid samples of the carrier signal being received, Xn is a sample value received at a time n; and $\sigma_0^2$ is an iteration initial value of the mean square error of the zero-mean component of the interference signal and is calculated according to the following equation:

$$\sigma_0^2 = \frac{1}{N}\sum_{n=1}^{N} (x_n - I_0)^2 + 1,$$

wherein N is the number of the valid samples of the received carrier signal, Xn is a sample value received at a time n.

2. The method according to claim 1, wherein, the transmitted signal is a BPSK-modulated signal, in the iterative calculation, $I_k$+i and $o_k$+i² are calculated according to the following equations:

Ik+1=I0−1Nn=1N tan h((xn−Ik)·sigma·k2)·sigma·k+
12=1+1Nn=1N((xn−Ik)2−tan h((xn−Ik)·
sigma·k2)2(xn−Ik))

Wherein, n and k are natural numbers, N is the number of the valid samples of the received carrier signal, Xn is a sample value received at a time n, k is a iteration number; $I_k$ is the K iteration value of the constant component of the interference signal, $o_k^2$ is the K iteration value of the mean square error of the zero-mean component of the interference signal.

3. The method according to claim 2, wherein further comprising: comparing, by the receiver, $|i_k+i-I_k|$ against a first threshold, comparing, by the receiver, $|<7_k+i^2-Ok^2|$ against a second threshold; when $|I_k+i-Ik|$ is less than the first threshold and $|ok+i^2-Ok^2|$ is less than the second threshold, terminating, by the receiver, the iterative calculation, wherein $I_k+i$ and $Ok+i^2$ are the quantity value of the constant component and the mean square error of the zero-mean component of the interference signal obtained in the K+I iteration, respectively.

4. The method according to claim 3, wherein that the total power value of the interference signal is the sum of $I_{k+1}^2$ and $\sigma_{k+1}^2$.

5. The method according to claim 1, wherein, the transmitted signal is a QAM-modulated signal, in the iterative calculation, $I_k+i$ and $o_k+i^2$ are calculated according to the following equations:

$Ik+1=I0-1Nn=1Nm=1M(2m-1)Sm,n(Ik,\text{sigma}\cdot k2)$
$m=1\ MCm,n(Ik,\text{sigma}\cdot k2)\cdot\text{sigma}\cdot k+$
$12=\text{sigma}\cdot o2-1Nn=1N(m=1M(4m(m-1)Cm,n$
$(Ik,\text{sigma}\cdot k2)-2(2m-1)(xn-Ik)Sm,$
$n(Ik,\text{sigma}\cdot k2))m=1MCm,n(Ik,\text{sigma}\cdot k2))$ Wherein, M represents a constellation order of the real and imaginary parts in QAM, Cm, n (I, ·sigma·2)=exp(−2m(m−1)·sigma·2) cos h((2m−1)(xn−I)·sigma·2)Sm,n(I,·sigma·2)=exp(−2m(m−1)·sigma·2)sin h((2m−1)(xn−I)·sigma·2)

Wherein, n, m, k are natural numbers, N is the number of the valid samples of the received carrier signal, Xn is a sample value received at a time n; $I_k$ is the K iteration value of the constant component of the interference signal, $o_k^2$ is the K iteration value of the mean square error of the zero-mean component of the interference signal.

6. The method according to claim 5, wherein further comprising:
comparing, by the receiver, $|I_{k+1}-I_k|$ against a first threshold, comparing, by the receiver, $|\sigma_{k+1}^2-\sigma_k^2|$ against a second threshold;
when $|I_{k+1}-I_k|$ is less than the first threshold and $|\sigma_{k+1}^2-\sigma_k^2|$ is less than the second threshold, terminating, by the receiver, the iterative calculation, wherein $I_{k+1}$ and $\sigma_{k+1}^2$ are the quantity value of the constant component and the mean square error of the zero-mean component of the interference signal obtained in the K+1 iteration, respectively.

7. The method according to claim 6, wherein that the total power value of the interference signal is the sum of $I_{k+1}^2$ and $\sigma_{k+1}^2$.

8. A system for measuring interference signal in a carrier signal, characterized in comprising at least one processor configured to:
receive multiple valid samples of the carrier signal, the carrier signal including a transmitted signal and an interference signal, the interference signal having a constant component and a zero-mean component;
based on the multiple valid samples of the carrier signal, obtain a quantity value of the constant component and a mean square error of the zero-mean component of the interference signal through an iterative calculation;
obtain a total power value of the interference signal from the quantity value of the constant component and the mean square error of the zero-mean component of the interference signal, so that the quality of carrier channel can be assessed; and
performing an iterative calculation using $I_0$ and $\sigma_0^2$ to obtain a quantity value $I_{K+1}$ of the constant component and a mean square error $\sigma_{K+1}^2$ of the zero-mean component of the interference signal, wherein $I_{k+1}$ is the (K+1)th iteration value of the constant component of the interference signal, $\sigma_{k+1}^2$ is the (K+1)th iteration value of the mean square error of the zero-mean component of the interference signal; and, wherein
in the iterative calculation:
$I_0$ is an iteration initial value of the constant component of the interference signal and is calculated according to the following equation:

$$I_0 = \frac{1}{N}\sum_{n=1}^{N} x_n,$$

wherein N is the number of the valid samples of the carrier signal being received, Xn is a sample value received at a time n; and
$\sigma_0^2$ is an iteration initial value of the mean square error of the zero-mean component of the interference signal and is calculated according to the following equation:

$$\sigma_0^2 = \frac{1}{N}\sum_{n=1}^{N}(x_n - I_0)^2 + 1,$$

wherein N is the number of the valid samples of the received carrier signal, Xn is a sample value received at a time n.

9. The system according to claim 8, wherein, for a transmitted signal which is a BPSK-modulated signal, the at least one processor is further configured to calculate $I_k+i$ and $c_k+i^2$ according to the following equations respectively:

$Ik+1=I0-1Nn=1N \tan h((xn-Ik)\cdot\text{sigma}\cdot k2)\cdot\text{sigma}\cdot k+$
$12=1+1\ Nn=1N((xn-Ik)2-\tan h((xn-$
$Ik)\cdot\text{sigma}\cdot k2)2(xn-Ik))$ wherein, n and k are natural numbers, N is the number of the valid samples of the received carrier signal, Xn is a sample value received at a time n; I.sub.k is the K iteration value of the constant component of the interference signal, ·sigma·.sub.k.sup.2 is the K iteration value of the mean square error of the zero-mean component of the interference signal; for a transmitted signal which is a QAM-modulated signal, the iterative calculation unit calculates I.sub.k+1 and ·sigma·.sub.k+1.sup.2 according to the following equations respectively:

$Ik+1=I0-1Nn=1Nm=1M(2m-1)Sm,n(Ik,\text{sigma}\cdot k2)$
$m=1MCm,n(Ik,\text{sigma}\cdot k2)\cdot\text{sigma}\cdot k+$
$12=\text{sigma}\cdot o2-1Nn=1N(m=1M(4m(m-1)Cm,n$
$(Ik,\text{sigma}\cdot k2)-2(2m-1)(xn-Ik)Sm,n(Ik,$
$\text{sigma}\cdot k2))m=1MCm,n(Ik,\text{sigma}\cdot k2))$ wherein, M represents a constellation order of the real and imaginary parts in QAM, Cm,n(I, ·sigma·2)=exp(−2m (m−1)·sigma·2) cos h((2m−1)(xn−I)·sigma·2) Sm,n(I, ·sigma·2)=exp (−2m (m−1)·sigma·2) sin h((2m−1) (xn−I)·sigma·2)
wherein, n, m, k are natural numbers, N is the number of the valid samples of the received carrier signal, Xn is a sample value received at a time n; $I_k$ is the K iteration value of the constant component of the interference signal, $\sigma^2$ is the K iteration value of the mean square error of the zero-mean component of the interference signal.

10. The system according to claim 9, wherein that the at least one processor is further configured to:

compare $|I_{k+1}-I_k|$ against a first threshold and compare $|\sigma_{k+1}^2-\sigma_k^2|$ against a second threshold; when $|I_{k+1}-I_k|$ is less than the first threshold and $|\sigma_{k+1}^2-\sigma_k^2|$ is less than the second threshold, terminate the iterative calculation, wherein $I_{k+1}$ and $\sigma_{k+1}^2$ are the quantity value of the constant component and the mean square error of the zero-mean component of the interference signal obtained in the K+1 iteration, respectively;

the at least one processor is further configured to calculate the sum of $I_{k+1}^2$ and $\sigma_{k+1}^2$ as the total power value of the interference signal.

* * * * *